No. 686,269. Patented Nov. 12, 1901.
J. DEVANTERY.
BOILER TUBE.
(Application filed Jan. 30, 1901.)
(No Model.)

WITNESSES:

INVENTOR
Joseph Devantery
BY
his ATTORNEY

THE NORRIS PETERS CO., PHOTO-LITHO., WASHINGTON, D. C.

UNITED STATES PATENT OFFICE.

JOSEPH DEVANTERY, OF BROOKLYN, NEW YORK, ASSIGNOR TO THE "LOCOMOBILE" COMPANY OF AMERICA, OF NEW YORK, N. Y., A CORPORATION OF WEST VIRGINIA.

BOILER-TUBE.

SPECIFICATION forming part of Letters Patent No. 686,269, dated November 12, 1901.

Application filed January 30, 1901. Serial No. 45,311. (No model.)

*To all whom it may concern:*

Be it known that I, JOSEPH DEVANTERY, a citizen of the United States, and a resident of the borough of Brooklyn, New York city, State of New York, have invented certain new and useful Improvements in Boiler-Tubes, of which the following is a specification.

My invention relates to improvements in boiler-tubes, and is designed to produce a tube which may be easily and safely removed from the boiler without disturbing the other boiler parts and may be easily, safely, and securely replaced.

In the use of boilers it frequently becomes necessary and desirable to inspect the interior of the same, and unless means are provided to facilitate such inspection the operation is exceedingly troublesome and inconvenient. This is especially true in small tubular high-pressure boilers situated where they are not readily accessible. In such cases if the tubes are expanded in the headers in the usual manner the boiler must generally be removed for repairing the tubes or for inspection, a process taking much time and constituting a great annoyance. By my invention I have obviated the difficulties heretofore existing and have provided a removable boiler-tube easily taken out and replaced.

In the following, with reference to the accompanying drawings, I have described a structure embodying my invention, the features of said invention being more particularly pointed out hereinafter in the claims.

Figure 1:
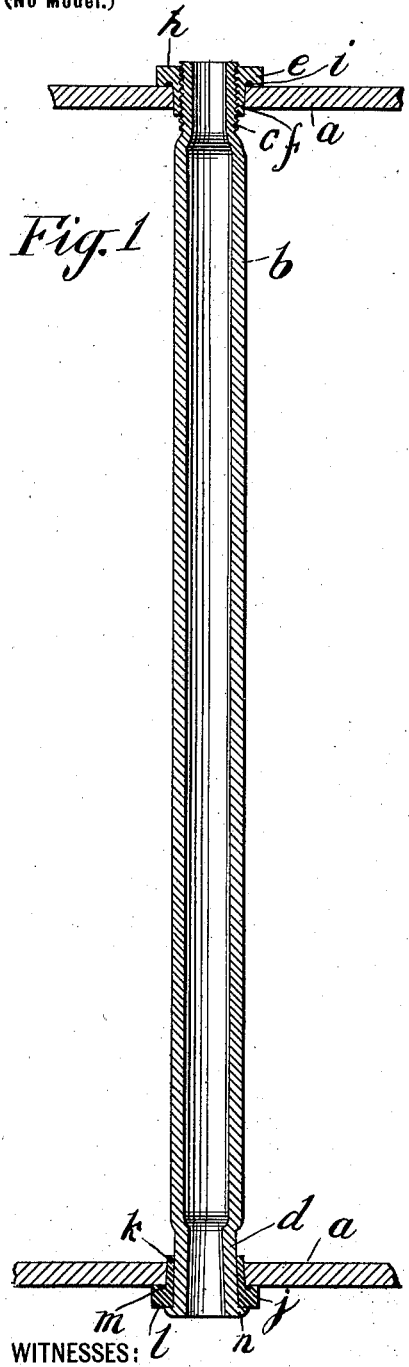
Figure 2:
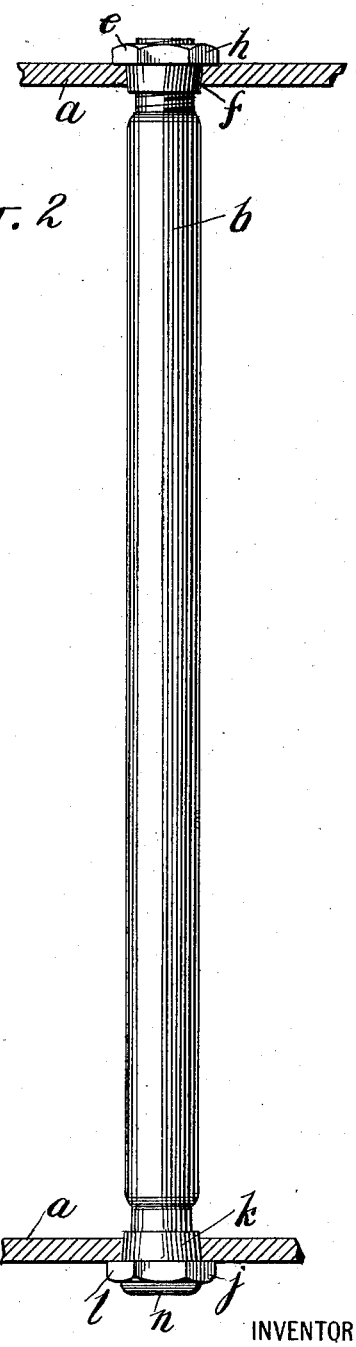

Figure 1 is a vertical sectional view of a boiler-tube inserted in the headers of a boiler, and Fig. 2 is a front elevation of the same, the headers only being shown in section.

Similar letters refer to similar parts throughout the several views.

$a\ a$ are portions of the headers of a boiler, the rest being broken away.

$b$ is a boiler-tube having a threaded neck $c$ at one end and a smooth neck $d$ at the other. The diameters of the necks are preferably less than the diameter of the tube itself. The tube is preferably of sufficient diameter to fit the boiler-tube perforations in the headers. The threaded neck $c$ is provided with a nut $e$, having a tapered sleeve $f$ and an enlarged head $h$. The head may be provided with means $i$ for inserting packing thereunder. The smooth neck $d$ is provided with a threadless nut $j$, tapering in diameter and having a tapered sleeve $k$ and an enlarged head $l$. The head $l$ may be provided with means $m$ for inserting packing thereunder. The smallest diameter of nut $j$ is adapted to snugly fit neck $d$.

In the operation of the device the smooth neck $d$ is expanded in nut $j$ and its end turned over the head of the nut, as shown at $n$, making a solid connection between the nut and the tube. The tube is then passed through the boiler-tube perforations in the headers and nut $e$ is screwed on. The tapered sleeves of the nuts $e$ and $j$ make a steam-tight joint with the headers. In removing the tube you need only unscrew nut $e$ and lightly tap the end of the tube, when it may be easily withdrawn from the boiler.

It is within the scope of my invention to have the necks and sleeves at each end threaded, thus making each end adjustable; but I prefer the means described, as it is cheaper, more convenient, and as effective as the other.

The device as described is especially adapted for use with self-propelled wheeled vehicles wherein small upright tubular boilers are used; but it is obvious that removable tubes could be used in connection with other boilers, and I do not restrict myself to the device as shown.

Having described my said invention, what I claim, and desire to secure by Letters Patent of the United States, is—

1. A boiler-tube provided at each end with an externally-smooth sleeve tapering evenly on the outside inwardly from the end of the tube and adapted to form a steam-tight joint with the headers of the boiler.

2. A boiler-tube having a sleeve tapering inwardly from the end of the tube firmly secured to one end and a similarly-tapering sleeve screw-threaded to the other end, the respective sleeves being adapted to form a steam-tight joint with the headers of the boiler.

3. A boiler-tube contracted at each end to form a neck, each neck being of the same diameter throughout its length and provided with a sleeve tapering on the outside inwardly from the end of the tube and adapted to form a steam-tight joint with the headers of the boiler.

4. A boiler-tube having a smooth neck at one end adapted to receive a tapering collar provided with a tapering sleeve and a threaded neck at the other end provided with a threaded collar having a tapering sleeve, said sleeves being adapted to form a steam-tight joint with the headers of the boiler.

5. A boiler-tube having a smooth neck at one end adapted to receive and to be turned over upon a tapering collar provided with a tapering sleeve and a threaded neck at the other end adapted to receive a threaded collar having a tapering sleeve, said sleeves being provided with means for making a steam-tight joint with the headers of the boiler.

In witness whereof I have signed my name in the presence of two subscribing witnesses.

JOSEPH DEVANTERY.

Witnesses:
   KATE N. FRANKLIN,
   SEABURY C. MASTICK.